United States Patent
Friesen et al.

(10) Patent No.: US 7,720,778 B2
(45) Date of Patent: May 18, 2010

(54) ONCOLOGY-DRIVEN SERVICE SELECTION USING A GENERIC SERVICE CONTRACT

(75) Inventors: Andreas Friesen, Steinfeld (DE); Kioumars Namiri, Karlsruhe (DE)

(73) Assignee: SAP AG, Walldorf (DE)

( * ) Notice: Subject to any disclaimer, the term of this patent is extended or adjusted under 35 U.S.C. 154(b) by 378 days.

(21) Appl. No.: 11/595,327

(22) Filed: Nov. 10, 2006

(65) Prior Publication Data
US 2007/0130443 A1 Jun. 7, 2007

(30) Foreign Application Priority Data
Nov. 10, 2005 (EP) ............................... 05024521

(51) Int. Cl.
G06N 5/00 (2006.01)
G06F 17/00 (2006.01)
(52) U.S. Cl. ........................................ 706/45
(58) Field of Classification Search ............... 706/45
See application file for complete search history.

(56) References Cited

U.S. PATENT DOCUMENTS

2003/0182413 A1* 9/2003 Allen et al. .............. 709/223
2006/0206440 A1* 9/2006 Anderson et al. .......... 705/500
2006/0242101 A1* 10/2006 Akkiraju et al. ............ 707/1

OTHER PUBLICATIONS

Paolucci et al. "Semantic Matching of Web Services Capability", ISWC 2002, LNCS 2342, pp. 333-347.*
Haarslev, Volker , et al., "Racer User's Guide and Reference Manual", Racer User's Guide and Reference Manual, Version 1.6, (Jul. 26, 2001).
Li, Lei , et al., "A Software Framework for Matchmaking Based on Semantic Web Technology", Proc. of Twelfth International World Wide Web Conference (WWW2003), ACM 1-58113-680-3/03/0005,(May 2003), 331-339.
Smith, Michael K., et al., "Owl Web Ontology Language Guide", W3C Recommendation, http://www.w3.org/TR/2004/REC-owl-guide-20040210, (Feb. 10, 2004), 1-53.

* cited by examiner

*Primary Examiner*—David R Vincent
*Assistant Examiner*—Li-Wu Chang
(74) *Attorney, Agent, or Firm*—Brake Hughes Bellermann LLP

(57) ABSTRACT

Example implementations relate to a system for selecting a provider service that fulfills a specification of a service request. The system includes a storage unit, a transformer unit, and a selection unit. The storage unit is configured to store a generic contract that is a concept of an ontology and a provider sub-concept that is a further concept of the ontology and a sub-concept of the generic contract. The provider sub-concept represents the provider service. The transformer unit is configured to transform the service request to a request sub-concept that is a concept of the ontology and a sub-concept of the generic contract. The selection unit is configured to select the provider service in case that the request sub-concept is a sub-concept of the provider sub-concept.

14 Claims, 7 Drawing Sheets

ONCOLOGY-DRIVEN SERVICE SELECTION USING A GENERIC SERVICE CONTRACT

CROSS-REFERENCE TO RELATED APPLICATION

This application claims priority under 35 U.S.C. §119 to European Patent Application EP05024521.6, filed Nov. 10, 2005, titled "SYSTEM AND METHOD FOR DYNAMIC SELECTION OF SERVICES," which is incorporated herein by reference in its entirety.

TECHNICAL FIELD

This description relates generally to the field of electronic data processing and more particularly to software architecture.

BACKGROUND

In recent years, electronic data processing has been used more and more for commercial activities between two or more parties. As an example, many companies and people use Web services to order or purchase products through the Internet. In an example case, a company may have a computer system that provides an order system, that is, a computer program for ordering products. The order system may provide a user interface so that an employee of the company can enter data required for ordering the products. The order system may be configured so that it can invoke a Web service of a supplier using the entered data. For this, the order system may, for example, add further data and invoke the Web service with the entered data and the further data in a specific format. The Web service may then trigger a process for providing the ordered products.

In a service-oriented architecture, processes are modelled with services as modular processing units. The services may be Web services or further services. The services are described by a specification and can be invoked according to the specification. Therefore, the services can be used in a flexible way by different requesters and independently of the internal processing of data.

Furthermore, a requester of a service and a provider of the service may negotiate a contract. The contract may specify certain properties of the service and an agreement, for example a price that is effective when the service is requested according to the certain properties.

The requester of a service may have access to a plurality of available services that potentially fulfill a service request and that may be subject to contracts. In such a case, the requester may, for example, invoke all services that potentially fulfill the service request and analyze results provided by the services to select a service for fulfilling the service request. This may involve processing and transferring of many data, so that a lot of computer resources and connection resources are consumed. Furthermore, it may be required to specify more data for invoking the services that potentially fulfill the service request than to select the service for fulfilling the service request.

A semantic web has been suggested to discover services in e-commerce. A semantic web includes a description of data so that the data can be read and understood by computer systems. The data may be described using an ontology. Generally, the ontology is a conceptual schema for defining relevant entities of a set of data, relationships between the entities, and rules for the entities. Therefore, the ontology defines the contents of the data. The ontology is complete, that is, relevant entities, relationships and rules are included in the ontology. The ontology of a domain may be a domain-specific ontology that is valid for the domain. The ontology may be accessible by a computer program and enable the computer program to infer properties or property values for an entity of the ontology according to the ontology. The services may be described by using a web services description language (WSDL). In a semantic web, a service may be matched to a service request in a flexible way, because matching may be possible even if the specifications of the service and the service request are different. The specifications may be different, for example, due to a different level of description, that is, the specification of the service request may be more detailed than the specification of the service. The service request may be matched with a service without transforming, for example, the service request to the specification of the service to compare the specifications on the same level. However, for selecting the service the plurality of services are described by an identical ontology and the potentially suitable services may have to be invoked.

SUMMARY

In example implementations, a requester may have a service request, that is, a request for a service according to a specification. The requester may have access to one or more provider services, that are services offered by a provider. The provider services may be based on a contract with the provider of the provider service. The requester may desire to select a provider service that can fulfill the service request.

Example implementations include a system for selecting the provider service. The system has a storage unit storing a generic contract that has one or more sub-concepts representing the one or more provider services. The generic contract and the sub-concepts are concepts of an ontology. Generally, a sub-concept of the generic contract inherits one or more properties of the generic contract. The system has also a transformer unit that can transform the service request to a sub-concept of the generic contract. The provider service is selected by a selection unit of the system that tests whether the transformed service request is a sub-concept of the sub-concept representing the provider service. This is the case if, for example, the service request is more specific with respect to one or more properties than the sub-concept of the service provider. The system has the data used for selecting the provider service in the storage unit. Therefore, the system can select the provider service without invoking the provider service. This leads to a reduced consumption of computing resources and connection resources. The ontology provides an efficient structure to model concepts and their properties and therefore the provider service can be described without listing possible combinations of property values of the provider service. A number of possible combinations can be very large and may increase exponentially with the number of properties of the provider service. Using the ontology, it is possible to save computer and memory resources. Furthermore, the ontology provides a structure so that the selection unit can test whether the sub-concept of the service request is a sub-concept of the sub-concept representing the provider service. It is not required to test whether the sub-concept of the service request is a super-concept or has an intersection with the sub-concept representing the provider service. Therefore, the selection may save computing resources by testing for sub-concepts.

Further example embodiments disclose a method for selecting the provider service that fulfills the service request. The method may include transforming the service request to a sub-concept of the generic contract, and selecting the provider service represented by a sub-concept of which the service request sub-concept is a sub-concept. The method for selecting the provider service provides desired aspects that are also provided by the system for selecting the provider service.

Further example embodiments include a computer program product referring to features of the same or similar methods just described. For example, a computer program product may include instructions that are transferable to a computer system and that cause the computer system to store the generic contract that is a concept of the ontology and a provider sub-concept that is a further concept of the ontology and a sub-concept of the generic contract. The provider sub-concept may represent a provider service that fulfills a specification of a service request. The instructions may further cause the computer system to transform the service request to a request sub-concept that is a concept of the ontology and a sub-concept of the generic contract, and to select the provider service when the request sub-concept is a sub-concept of the provider sub-concept.

The details of one or more implementations are set forth in the accompanying drawings and the description below. Other features will be apparent from the description and drawings, and from the claims.

DETAILED DESCRIPTION

The following example implementations are intended merely for non-limiting, illustrative purposes. Thus, the example features are not intended to limit the scope of the example implementations, or to be exhaustive regarding such implementations.

Figure 1:
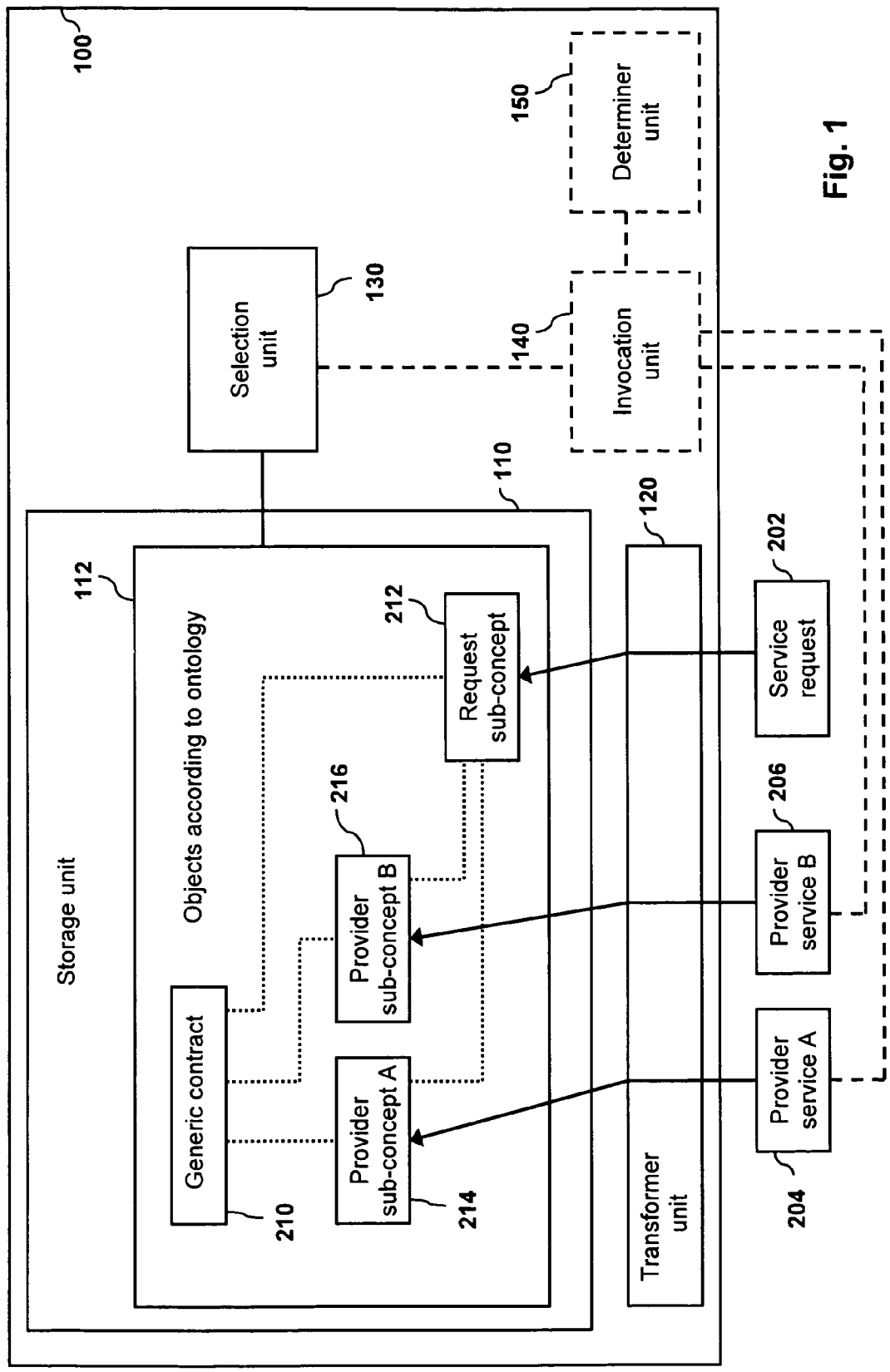
FIG. 1 is a block diagram of a system for dynamic service selection.

FIG. 1 shows an example embodiment in the context of an example scenario. The example embodiment is a system 100 for selecting a provider service that fulfills a specification of a service request. The system 100 includes units that characterize this example of the system, and units that are optional to this example embodiment. The optional units are displayed with dashed lines. Lines between units of the system represent interfaces for transferring data between the units and dashed lines represent optional interfaces. The scenario is characterized by elements of the system 100, by further elements coupled to the system 100, and by concepts and relations according to an ontology. The relations between the concepts are represented by dotted lines. First, the elements of the system are described, and then the scenario with the further elements and the concepts and the relations are described.

The system 100 includes a storage unit 110 configured to store a generic contract 210 that is a concept of the ontology, and provider sub-concepts 214, 216 that are further concepts of the ontology and sub-concepts of the generic contract 210. The provider sub-concepts 214, 216 represent the provider services 204, 206 as is indicated by arrows.

Generally, ontologies may have specifications which differ in details. The ontology that is used in example embodiments may have the following features: the ontology may have concepts and the concepts may have properties. A property of a concept may be identified with a relation. The property may have a range which may be a further concept or a simple datatype, for example, a string. As a simple example, a car may be a concept of an ontology. It may have the property hasColor which is a relation to a range. The range may be one or more concepts or may be one or more simple datatypes. In the simple example, hasColor may have a string range consisting of the values red, green, or blue. A concept of an ontology may be related by an "is a" relation to a further concept meaning that the concept inherits properties of the further concept. The concept may be also called a sub-concept of the further concept. The concept may have further properties that are not inherited. The concept that inherits a property of the further concept has the inherited property with a range that is identical to the range valid for the further concept or that is more specific than the range valid for the further concept. In the simple example, the car may have a sub-concept sports car that has the property hasColor with the range red. In the ontology, it may be possible to create a hierarchy of concepts using such an inheritance relation between the concepts. The inheritance relation is a special relation. The properties are further relations, for example, relations of the type "has" relation. Within an ontology a plurality of different relations may relate properties to the concepts of the ontology. Ontologies with such structural features can be used in example implementations. In some ontologies a concept is called a class and a sub-concept is called a sub-class, or may be called other known or suitable names. Furthermore, it may be possible that a system with such structural features is not described as an ontology but qualifies as an ontology and therefore may be used in example implementations.

The generic contract of the ontology is a concept that is created with properties so that provider services and request services may be represented by sub-concepts of the generic contract. Such sub-concepts may be related to the generic contract by more than one "is a" relation. In a further example, it may be possible to enhance the ontology and the generic contract with further concepts, properties and ranges so that, for example, a change of scenarios can be modelled appropriately.

The system includes a transformer unit 120 configured to transform the service request to a request sub-concept that is a concept of the ontology and a sub-concept of the generic contract. For this, the transformer unit 120 may identify individual parts of a specification of the service request and map the individual parts to properties and ranges of the ontology. Such a mapping may include a mapping table in which a possible specified part of the specification, that is, a specified requirement, is related to property of the ontology. In a further example, the specified requirement may be related to a property and a property range which is used for relating the property to the request sub-concept. The properties to which the individual parts have been mapped may be then added to the request sub-concept with the appropriate range. The resulting request sub-concept is a sub-concept of the generic contract which may be checked in an optional consistency check.

The system further includes a selection unit 130 configured to select the provider service in case that the request sub-concept is a sub-concept of the provider sub-concept. The request sub-concept is a sub-concept of the provider sub-concept in case that the request sub-concept can be related by one or more "is a" relations to the provider sub-concept. In other words, a sub-concept is a sub-concept of a further sub-concept in case that the sub-concept has properties that include properties of the further sub-concept and that the range is equal to or more specific than for the further sub-concept. In example embodiments, the selection unit 130 may include a reasoner that is configured to apply subsumption reasoning to subsume a sub-concept of the generic contract. The reasoner is described in further details in following parts related to FIG. 3 to FIG. 6. In an example, the selection unit 130 may identify one provider sub-concept of which a specific request sub-concept is a sub-concept, that is, the request sub-concept can be subsumed under the provider sub-concept. The selection unit 130 may use a representation relation between the one provider sub-concept and the provider service represented by the one provider sub-concept to identify the provider service that is selected.

The system may further include an optional invocation unit 140 configured to invoke provider services selected by the selection unit 130 so that a specified set of data is obtained from the one or more provider services. The system may include an optional determiner unit 150 configured to determine a provider service based on the specified set of data.

In the figure, the scenario includes also further elements, concepts, and relations between the concepts. Provider service A 204 may be for example a Web service that can be invoked by a requester having the system 100, that is, the requester has access to the Web service. The Web service may be publicly available or with a restricted access. Provider service A 204 complies with a contract that may have been negotiated or agreed on in any further form between the requester and a provider of the provider service A. Provider service B 206 is provided by a further provider and is based on a contract with the further provider. In a further example, provider services may be provided by an identical provider. In the example, the system has the transformer unit 120 that is further configured to transform provider services 204 and 206 into provider sub-concepts 214 and 216 respectively. The transformer unit 120 may transform the provider services with a mapping table for identifying the properties and property ranges of the provider sub-concepts. The transformer unit 120 may transform the provider services in a way that is equal to transforming the service request. In the figure, an arrow from provider service A 204 to provider sub-concept A 214 displays that provider sub-concept A represents provider service A. Similarly, a further arrow displays that provider sub-concept B 216 represents provider service B 206. The sub-concepts 214 and 216 are sub-concepts of a generic contract 210. The inheritance relations between the generic contract 210 and the sub-concepts 214 and 216 are represented by dotted lines. The ontology is defined so that the generic contract with the sub-concepts can be described according to the ontology. The generic contract is defined so that the provider services can be transformed to sub-concepts of the generic contract. This means that the generic contract has properties that are shared by the provider sub-concepts. In accordance with the example embodiments, the generic contract and the provider sub-concepts are stored in the storage unit 110 and more specifically in a part 112 that includes objects according to the ontology.

It is possible that the requester gains access to further provider services and further provider sub-concepts representing the provider services are added to the storage unit 110. It is also possible that a provider service is no longer accessible and therefore a representing provider sub-concept is erased from the storage unit 110.

The requester has a service request 202. The service request may include a concrete specification of the requested service. The requester desires that the service request is fulfilled by a service, that is, to find a service that matches the service request. Furthermore, the requester may have preferences with regards to selecting a service, for example, to select the cheapest service that matches the service request. The transformer unit 120 transforms the service request 202 to a request sub-concept 212 that is stored in the part 112 of the storage unit 110. In a further exemplary embodiment the request sub-concept may be stored in a different way or may also not be stored. The request sub-concept 212 represents the service request. The ontology is configured to describe the request sub-concept and the generic contract is sufficiently generic so that the request sub-concept is a sub-concept of the generic contract. The selection unit 130 accesses the part 112 of the storage unit having the provider sub-concepts 214 and 216. The selection unit selects the provider sub-concepts 214 and 216 because the request sub-concept is a sub-concept of the sub-concepts 214 and 216. In the figure, the "is a" relations between the provider sub-concepts and the request sub-concept are represented by dotted lines. In an example, the request sub-concept may be more specific than the provider sub-concepts, that is, the request sub-concept has properties that on a level of specification different from the provider sub-concept properties. However, using the relations of the ontology the selection unit 130 has rules to decide that properties and ranges of the request sub-concept are consistent with properties and ranges of the provider sub-concepts. Therefore, the request sub-concept is a sub-concept of the provider sub-concepts, that is, with the ontology the selection unit 130 can infer the relation between the sub-concepts of the generic contract. Such a subsumption of the request sub-concept is possible even if the description of the request sub-concept is one or more levels more detailed than the provider sub-concepts. Furthermore, in the example the request sub-concept is described at the most detailed level available in the ontology, that is, with the most specific concept available in the ontology. Therefore, the request sub-concept has a level that is equal to or more specific than a level of the provider sub-concept and the subsumption reasoning is sufficient in order to check if the provider service fulfills the service request. In a further example, the request sub-concept may not be the most specific concept available in the ontology. However, in the further example the request sub-concept may still be more specific than the provider sub-concepts so that the subsumption reasoning is sufficient to check if the provider service fulfills the service request.

In a further example, it may be possible that the request sub-concept is unspecific and that the provider sub-concepts are very specific. In such a case the request sub-concept may for example be a super-concept of the provider sub-concept. In addition to the subsumption reasoning, that is, identifying provider sub-concepts from which the request sub-concept inherits the properties further types of reasoning may be done to check if the provider service fulfills the service request.

In the figure, the selection unit 130 is communicatively coupled to the invocation unit 140 so that the selection unit 130 may transfer identifiers of provider services that have been selected by the selection unit. The selection unit 130 has selected the provider sub-concepts and is configured to identify the provider services that are represented by the selected provider sub-concepts. In the exemplary scenario, this is provider service A and provider service B. The invocation unit 140 can be communicatively coupled to provider service A and provider service B. Therefore, the invocation unit may invoke the selected provider services and transfer results obtained by invoking the selected provider services to the determiner unit 150. The results are a specified set of data that depends on one or more criteria for selecting a provider service for fulfilling the service request. A criteria may be, for example, a price for ordering a product or a service described by the service. A further criteria may be how fast the provider can accomplish an order described offered by the service. It may also be that a plurality of criteria are coupled or have different weights. The determiner unit analyses the results and determines for example provider service A because it is cheaper than provider service B and further criteria are not taken into account.

Figure 2:
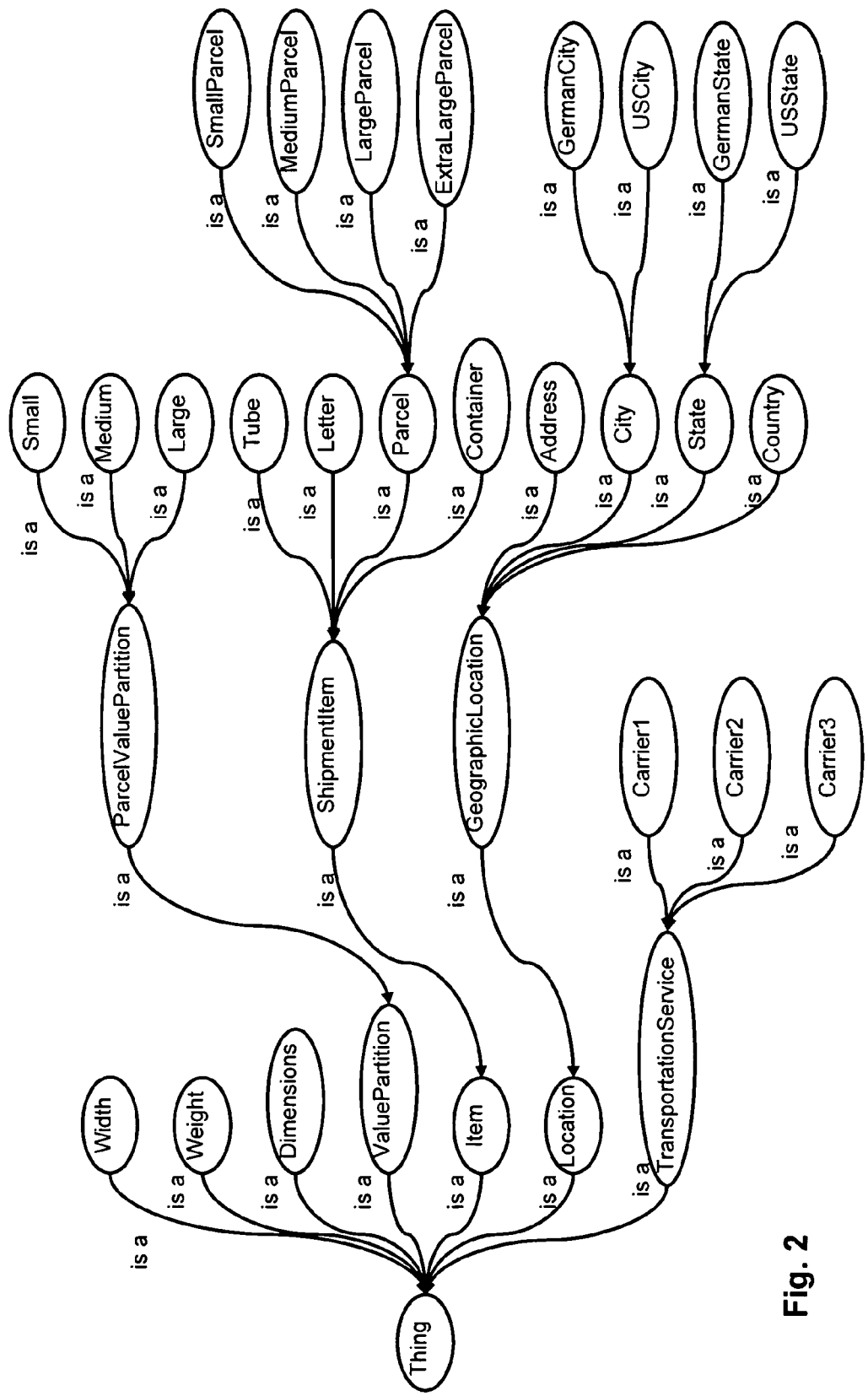
FIG. 2 is a diagram of elements of an example ontology.

FIG. 2 is a diagram of elements of an exemplary ontology. The exemplary ontology is a domain specific ontology for transportation services. The ontology may be used by a requester that is a shipper requesting transportation services. The providers may be carriers that offer a transportation service and provide an ordering of the transportation service through a Web service. The ontology is in accordance with a web ontology language (OWL) that is specified by the World Wide Web consortium (W3C). OWL has different sublanguages, in the example, OWL DL has been used but in further examples other ontology languages or sublanguages may be used, such as for example OWL Lite, web service modelling language (WSML) Flight, or WSML DL. According to OWL, a root node is identified with Thing and the generic contract is identified with concept TransportationService. In the figure, only the inheritance relations are displayed and properties of the generic contract are considered in following figures. The displayed elements of the ontology include entities that are sub-concepts of Thing and that may be also properties. The ontology includes further properties of the generic contract and sub-concepts of the generic contract which are not displayed in the figure. The sub-concepts, the properties, and the ranges are relevant for a domain of transportation services. The ontology and the generic contract are configured to describe entities of transportation services and of transportation service requests. In the figure, Thing has an "is a" relation to Width, Weight, Dimensions, ValuePartition, Item, Location, and TransportationService. The "is a" relation may relate a sub-concept to a concept or relate a sub-concept to a further sub-concept. The "is a" relation represents the inheritance relation between the related entities of the ontology. Therefore, the "is a" relation is a relation that is different from other relations that specify a property like, for example, a "hasFromLocation" relation or a "hasToLocation" relation.

The ValuePartition has an "is a" relation to ParcelValuePartition that has an "is a" relation to Small, Medium, Large. Item has an "is a" relation to ShipmentItem that has an "is a" relation to Tube, Letter, Parcel, Container. In the exemplary ontology only Parcel has an "is a" relation to SmallParcel, MediumParcelm, LargeParcel, and ExtraLargeParcel. Location has an "is a" relation to Address, City, State, and Country, wherein City has an "is a" relation to GermanCity and USCity and State has a "is a" relation to GermanState and USState. The TransportationService that is identified with the generic contract has an "is a" relation to Carrier1, Carrier2, and Carrier3 that are identified with sub-concepts of the generic contract. In the exemplary ontology the provider service A (see FIG. 1) may for example be represented by a sub-concept Carrier1 of TransportationService. In a further example, a different ontology may be valid for the domain of transportation services. The definition of the ontology may depend on specific preferences and requirements of the shipper. In the exemplary ontology the specification of City as GermanCity and USCity may for example be relevant because the shipper is only interested in sending items between Germany and the USA. Accordingly, the contracts may be have been negotiated for the two countries only and the ontology and the generic contract specify sub-concepts with respect to the two countries. Displayed entities of the generic contract are sub-concepts that are related to each other through an "is a" relation. Properties of the generic contract and the sub-concepts according to the ontology are displayed in FIG. 3 to FIG. 6.

Figure 3A:
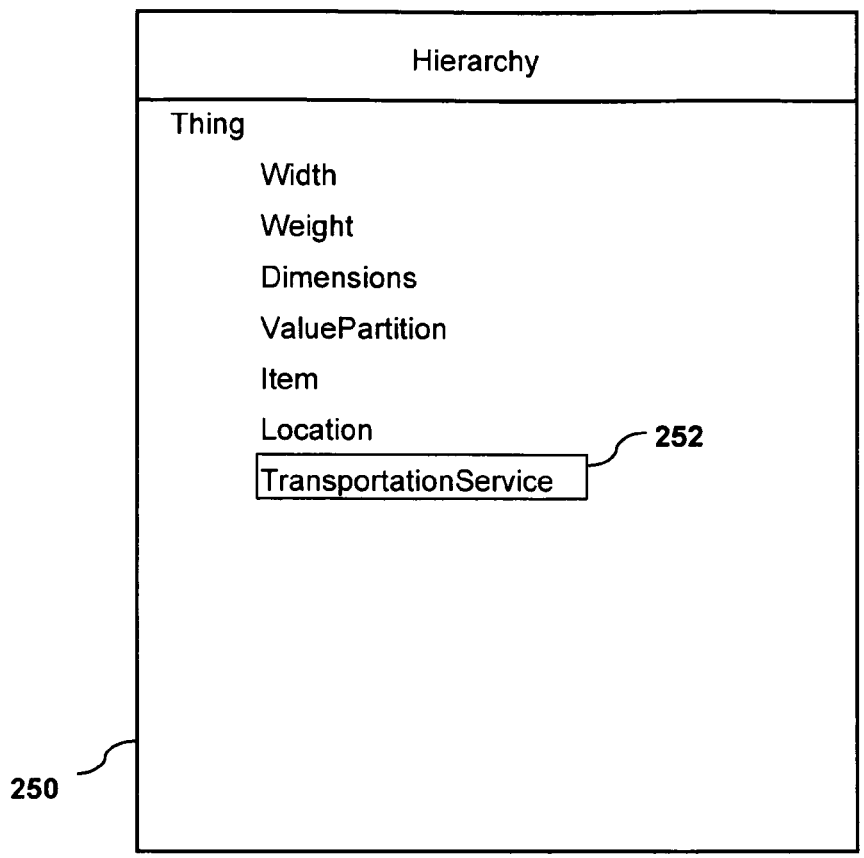
FIGS. 3a and 3b display graphical elements of a reasoner with example data related to a generic contract.
Figure 3B:
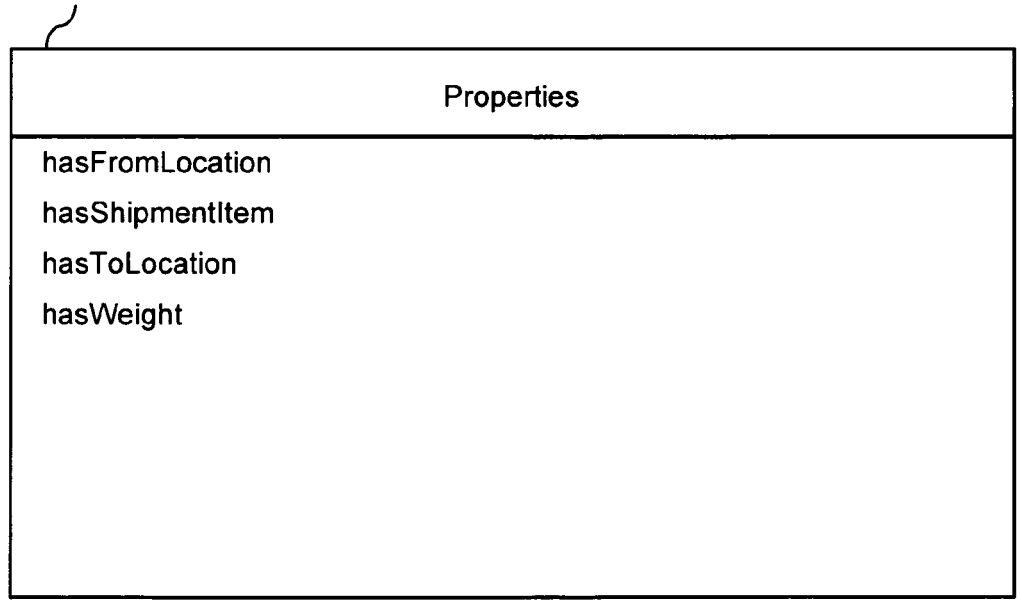

FIGS. 3*a* and 3*b* display graphical elements 250 and 260 of a reasoner with example data related to a generic contract. The reasoner may be a computer program that can subsume entities in a hierarchy of entities according to relations of the ontology. The reasoner may also be an inference engine. The reasoner may be a description logic reasoner or an inference engine based on a further first order logic fragment. In a more general example, based on the ontology the reasoner can infer or deduce that a concept is a sub-concept of a further concept. An example for a publicly available reasoner is RACER by Volker Haarslev and Ralf Möller. RACER allows for a representation of entities of the ontology and a subsumption according to a specific description logic. The specific description logic of RACER is the "SHIQ" logic.

The reasoner may access the part of the storage unit 110 that stores the objects described according to the ontology. In the example, graphical element 250 displays levels of a hierarchy according to the ontology of which elements are displayed in FIG. 2. It is possible to navigate in the hierarchy to see further parts of the hierarchy. According to the ontology, a first level of a hierarchy is identified with Thing and a second level is identified with entities related to Thing by an "is a" relation. Graphical element 250 displays the first level with Thing and the second level with Width, Weight, Dimensions, ValuePartition, Item, Location, and TransportationService. In the exemplary reasoner, it is possible to mark an entity of the hierarchy and display the properties and the ranges of the marked entity in graphical element 260. In the figure, TransportationService has a mark 252 and the graphical element 260 lists the properties of TransportationService: hasFromLocation, hasShipmentItem, hasToLocation, hasWeight. In the exemplary ontology, properties of the generic concept and sub-concepts are related to the generic concept and the sub-concepts a "has" relation type, such as for example, hasFromLocation or hasShipmentItem.

Figure 4A:
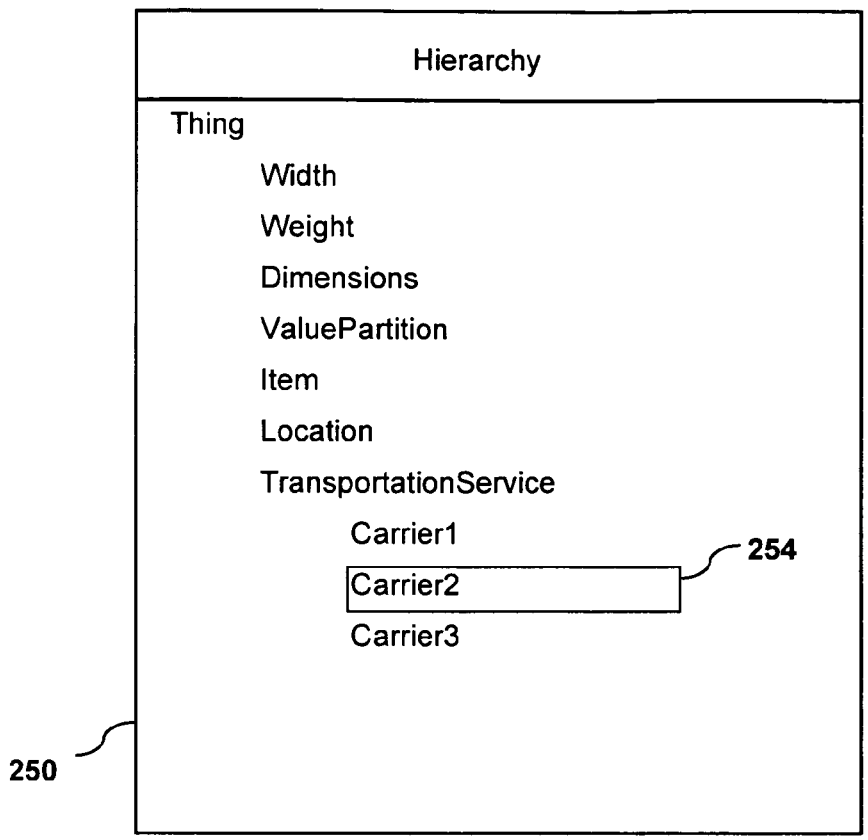
FIGS. 4a and 4b display the graphical elements of the reasoner with example data related to a provider sub-concept.
Figure 4B:
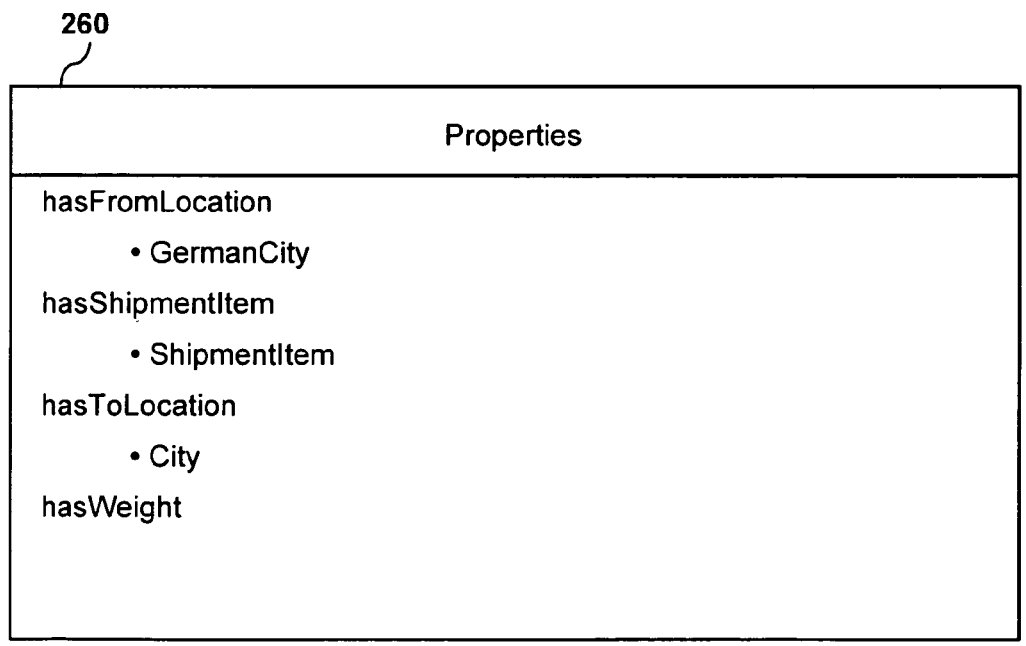

FIGS. 4*a* and 4*b* display the graphical elements 250, 260 of the reasoner with exemplary data related to a provider sub-concept. Graphical element 250 displays in addition to the first and second level of the hierarchy the sub-concepts related to TransportationService, that is, Carrier1, Carrier2, and Carrier3. Carrier2 has a mark 254 and accordingly graphical element 260 displays properties of Carrier2. Carrier2 is a sub-concept of TransportationService and has properties that are inherited from TransportationService. The property hasFromLocation is specified to be GermanCity, that is, has range GermanCity, the property hasShipmentItem has range ShipmentItem, and the property hasToLocation has range City. The property hasWeight is not specified by a sub-concept. In accordance with the ontology displayed partly in FIG. 2, the properties of Carrier2 are inferable by the "is a" relation from Thing.

The shipper that uses the reasoner may have a scenario which is described in FIGS. 4*a* and 4*b* and which is static for a period of time: the shipper has negotiated three contracts with three different carriers for shipping items. In a further example, a contract may also be created for example by establishing a connection to a Web service of a provider without negotiating with the provider. In the example, the three contracts are represented by provider sub-concepts of the generic contract. Prior to describing the generic contract and the sub-concepts the ontology has to be defined. The ontology may be defined by the shipper or by a further party having knowledge about the domain of transportation services. The further party may be a software company or a consulting company. The ontology may be based on the requests that the shipper makes and on services offered by carriers for example as Web services. Interfaces of the services offered by carriers may contribute to creating the ontology.

Figure 5A:
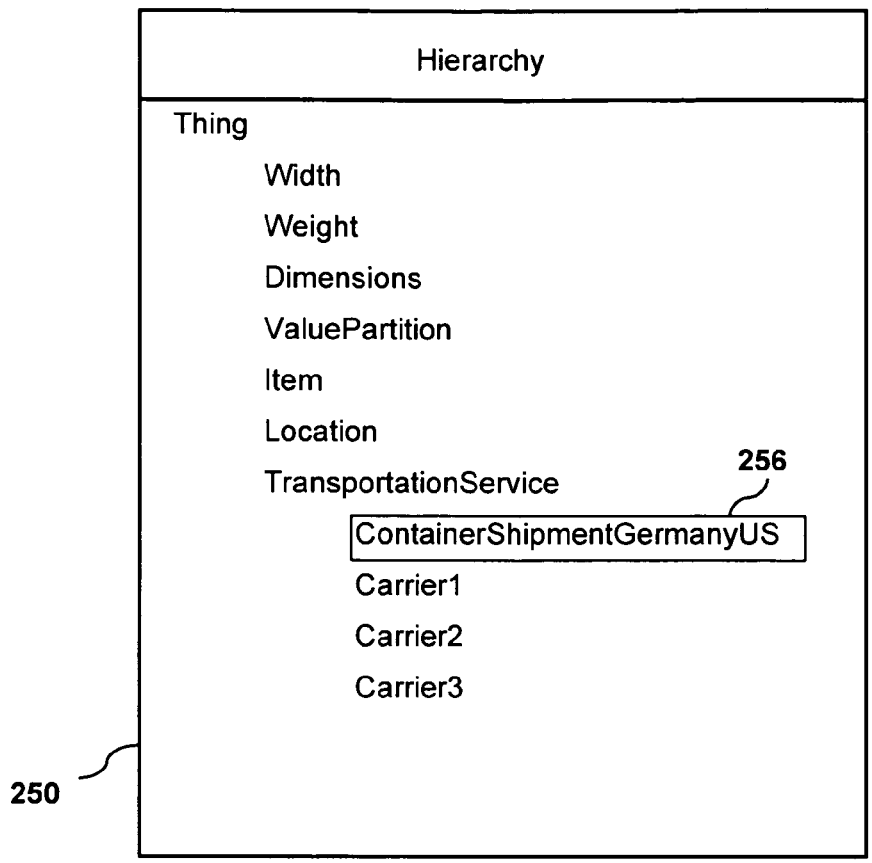
FIGS. 5a and 5b display the graphical elements of the reasoner with example data related to a request sub-concept.
Figure 5B:
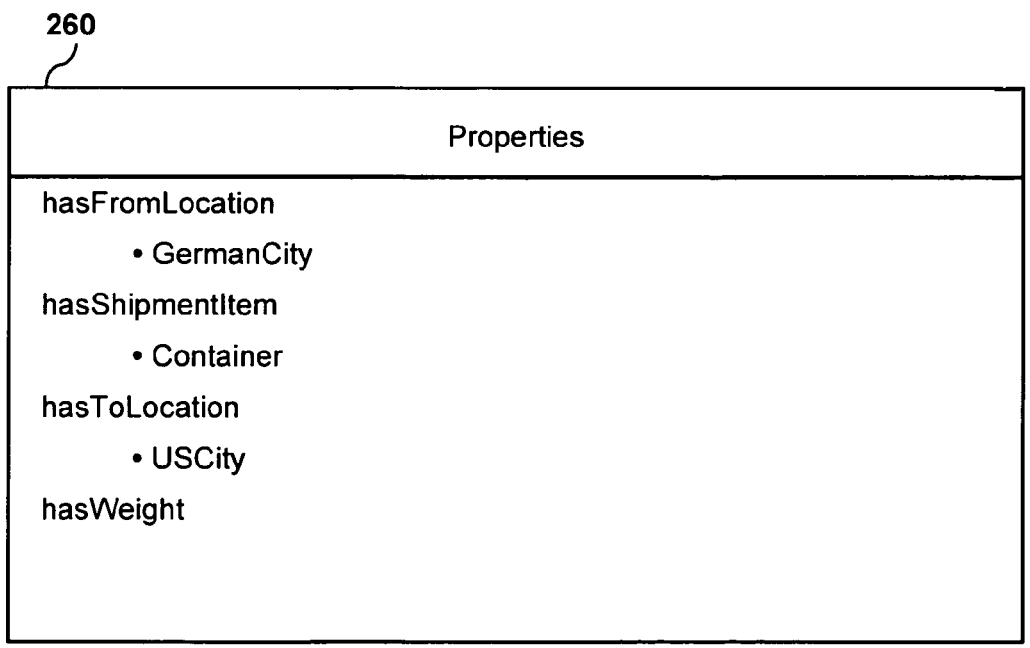

FIGS. 5a and 5b display the graphical elements 250 and 260 of the reasoner with example data related to a request sub-concept. In graphical element 250 a further entry ContainerShipmentGermanyUS is displayed as a sub-concept of the generic contract represented by TransportationService. ContainerShipmentGermanyUS represents a service request that the shipper desires to fulfill by a matching provider service. The transformer unit has transformed the service request to the request sub-concept ContainerShipmentGermanyUS. The accessible provider services are represented by Carrier1, Carrier2, and Carrier3.

ContainerShipmentGermanyUS has a mark 256 and graphical element 260 displays the properties and ranges of the service request. The properties are identical to the properties of the provider services and include hasFromLocation hasShipmentItem, hasToLocation, and hasWeight. However, ranges of the properties of the request sub-concept are more specific according to the ontology (see FIG. 2) than corresponding values of the properties of provider sub-concept Carrier2: the property hasShipmentItem has value Container which has a "is a" relation to ShipmentItem and therefore is a sub-concept of ShipmentItem; the property hasToLocation has value USCity which is a sub-concept of City.

FIGS. 5a and 5b display a typical situation prior to a subsumption of the reasoner: the provider and the request sub-concepts have been created and are sub-concepts of the generic contract. It depends on detailed properties and properties ranges of the sub-concepts whether the request sub-concept is a sub-concept of an accessible provider sub-concept. In a further example, the ontology may include many more entities, that is, the generic contract may have many properties with many property values and many provider sub-concepts. In such cases, a manual selection of a provider service that fulfills the service request is impractical. Furthermore, a selection of the provider service is more complicated than a matching of properties and property ranges because a description level of a property value of a provider sub-concept may be different from a description level of a property value of a request sub-concept.

Figure 6A:
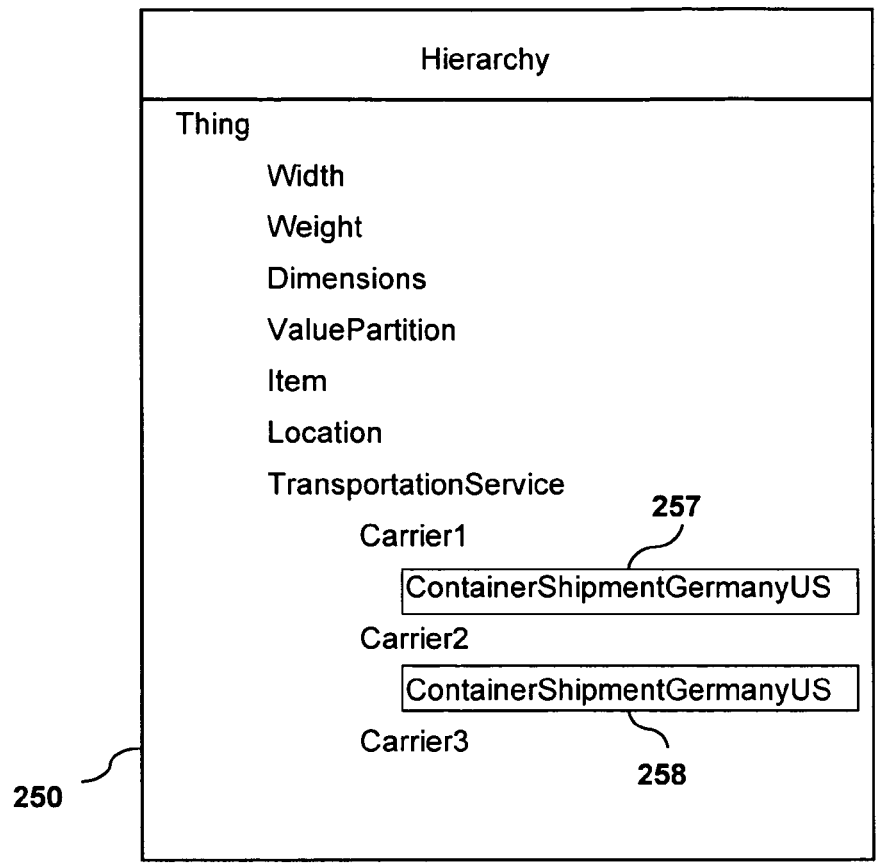
FIGS. 6a and 6b display the graphical elements of the reasoner with an example result of a subsumption.
Figure 6B:
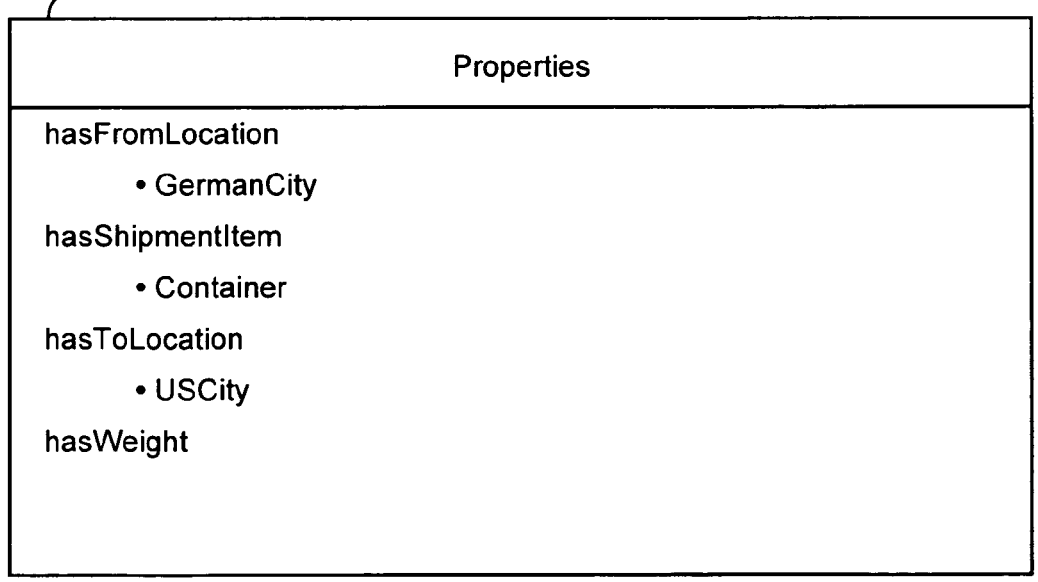

FIGS. 6a and 6b display the graphical elements 250 and 260 of the reasoner with an example result of a subsumption. The reasoner has done the subsumption and found that the request sub-concept ContainerShipmentGermanyUS is a sub-concept of the provider sub-concepts Carrier1 and Carrier2. According to the ontology (see FIG. 2) property ranges of ContainerShipmentGermanyUS (see FIGS. 5a and 5b) are in accordance with properties ranges of Carrier2 (see FIGS. 4a and 4b) and therefore ContainerShipmentGermanyUS is a sub-concept of Carrier2. In an example, the property ranges of Carrier1 may be identical with the property ranges of Carrier2 and therefore ContainerShipmentGermanyUS is also a sub-concept of Carrier1. However, Carrier3 may have for example property range GermanCity for the property hasToLocation and the request sub-concept does not comply with this property range. Therefore ContainerShipmentGermanyUS is not a sub-concept of Carrier3. The sub-concept ContainerShipmentGermanyUS has marks 257 and 258 and therefore the graphical element 260 displays the properties of the request sub-concept. The reasoner is configured to compare properties and ranges of the sub-concepts of the generic contract and to compare relations between the properties. With this, the reasoner can infer if a request sub-concept has properties with a more specific range than properties of a provider sub-concept and if the ranges are in accordance with the ranges of the provider sub-concept properties. For this the reasoner may access and use relevant entities and relations of the ontology.

According to the result of the subsumption the invocation unit 140 of the system may invoke Carrier1 service and Carrier2 service. The shipper may for example desire to fulfill the request ContainerShipmentGermanyUS by a cheaper one of the selected services. For this, the invocation unit 140 may invoke the services with the specification of the request ContainerShipmentGermanyUS and transfer the received data including a price to the determiner unit 150. According to the desire of the shipper the determiner unit 150 may for example determine the service Carrier1 because it is cheaper. In a further example, the shipper may desire to use the fastest selected transportation service and in case that two transportation services are equally fast the cheaper transportation service of the two is used. The determiner unit 150 may be configured to determine transportation service according to criteria that are customizable by a user of the system.

In a further example, the exemplary system using the reasoner may also be applied to a further ontology. The further ontology may be for example suitable for defining entities, relations, and rules that are relevant for services related to selling a used car. A service request may then be identified with a search for a used car. In the further example, the ontology defining the relevant features of the used cars may include many entities and using the system may be useful.

Figure 7:
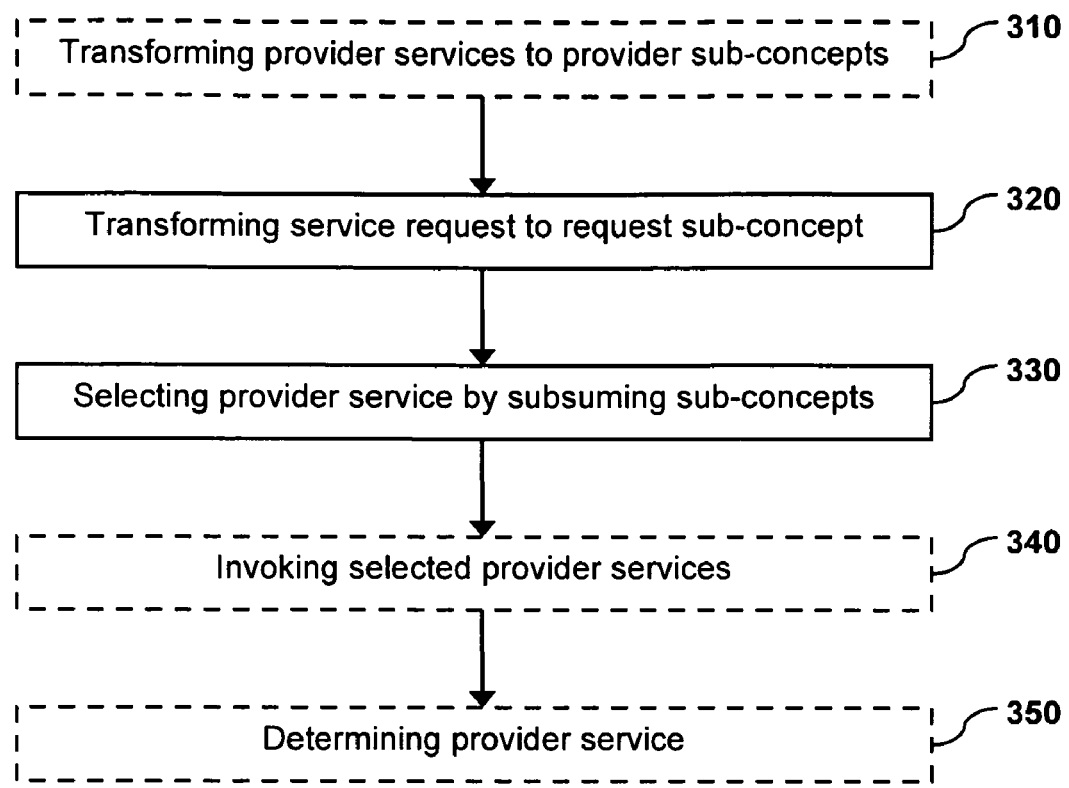
FIG. 7 is a simplified flow diagram of operations of example implementations.

FIG. 7 is a simplified flow diagram of an example embodiment. The embodiment is a computer-implemented method 300 for selecting the provider service that fulfills a specification of the service request. Optional operations of this example implementation are indicated by dashed lines. A person skilled in the art will appreciate that the described operations may also be executed in an order that is different from the order of the example embodiment.

The method 300 includes transforming 310 one or more provider services to provider sub-concepts that are sub-concepts of the generic contract. In an example, the provider service A 204 (see FIG. 1) is transformed to the provider sub-concept A 214. Transforming may include identifying specific characteristics of the provider service A 204. Transforming 310 may further include using a mapping table which maps possible characteristics of provider services to properties of the ontology. In the mapping table the specific characteristics may be identified and mapped to the properties and ranges of the provider sub-concept A 214. In the example embodiment, the operation of transforming 320 the service request to the request sub-concept that is a further sub-concept of the generic contract may occur. Transforming 320 may include using the mapping table that is also used for transforming the provider services. Transforming 320 may be done in the same way that transforming 310 is done. In the example, service request 202 (see FIG. 1) is transformed to request sub-concept 212. Then, the operation of selecting 330 the provider service in case that the request sub-concept is a sub-concept of the provider sub-concept may occur. The operation of invoking 340 one or more selected provider services may next be executed, so that a specified set of data is obtained from the one or more provider services. Finally in the example of FIG. 7, determining 350 a provider service based on the specified set of data may occur. For selecting the provider service the method 300 may use the reasoner that applies subsumption reasoning to subsume a plurality of sub-concepts of the generic contract.

A computer program product may include instructions that are transferable to a computer system and that cause the computer system to execute the operations of method 300. The computer program product may include computer-readable media for carrying or having computer-executable instructions, that is, instructions that are executable by a computer system or for carrying data structures stored thereon. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. In case that the computer-executable instructions are transformed, a first computer may for example transform the computer-executable instructions into the executable format and a second computer may execute the transformed instructions.

Example implementations are described in the general context of one or more methods, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Some example embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Example implementations also may be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An example system for example implementations might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations may be accomplished with standard programming techniques, with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

What is claimed is:

1. A system including instructions recorded on a computer-readable storage medium, the system for selecting a provider service that fulfills a specification of a service request, the system comprising:

a storage unit configured to store a generic contract that is a concept of an ontology;

a transformer unit executed by a computing device using the instructions and configured to transform a provider service and a second provider service into a provider sub-concept and a second provider sub-concept, respectively, transform the service request to a request sub-concept, and modify the ontology to obtain a modified ontology for storage within the storage unit, the modified ontology including the provider sub-concept, the second provider sub-concept, and the request sub-concept as concepts of the ontology and sub-concepts connected to the generic contract within the modified ontology, and to include the request sub-concept as a sub-concept connected to the provider sub-concept within the modified ontology; and a selection unit configured to select the provider service over the second provider service based on the modified ontology and including accessing the modified ontology from within the storage unit, and including a determination that the request sub-concept is a sub-concept of the provider sub-concept.

2. The system of claim 1, further comprising an invocation unit configured to invoke the provider service selected by the selection unit so that a specified set of data is obtained from the provider service.

3. The system of claim 2, further comprising a determiner unit configured to determine the provider service from one or more invoked provider services based on specified sets of data of the one or more invoked provider services.

4. The system of claim 1, wherein the selection unit comprises a reasoner that is configured to apply subsumption reasoning to subsume a sub-concept of the generic contract.

5. A computer-implemented method for selecting a provider service that fulfills a specification of a service request, the method comprising:

determining an ontology having a generic contract;
   transforming a provider service and a second provider service into a provider sub-concept and a second provider sub-concept, respectively;
   transforming the service request to a request sub-concept;
   modifying the ontology to obtain a modified ontology for storage within the storage unit, the modified ontology including the provider sub-concept, the second provider sub-concept, and the request-sub-concept as concepts of the ontology and sub-concepts connected to the generic contract within the modified ontology, and to include the request sub-concept as a sub-concept connected to the provider sub-concept within the modified ontology; and
   selecting the provider service over the second provider service based on the modified ontology and including accessing the modified ontology from within the storage unit, and including a determination that the request sub-concept is a sub-concept of the provider sub-concept.

6. The method of claim 5, further comprising invoking the selected provider service so that a specified set of data is obtained from the provider service.

7. The method of claim 6, further comprising determining a provider service from one or more invoked provider services based on specified sets of data of the one or more invoked provider services.

8. The method of claim 5, wherein selecting the provider sub-concept comprises using a reasoner that applies subsumption reasoning to subsume a sub-concept of the generic contract.

9. A computer program product comprising instructions that are transferable to a computer system and that cause the computer system to:

store a generic contract that is concept of an ontology;
   transform a provider service and a second provider service into a provider sub-concept and a second provider sub-concept, respectively;
   transform the service request sub-concept;
   modify the ontology to obtain a modified ontology for storage within the storage unit, the modified ontology including the provider sub-concept, the second provider the sub-concept, and the request sub-concept as concepts of the ontology and sub-concepts connected to generic contract within the modified ontology, and to include the request sub-concepts as a sub-concepts connected to the provider sub-concept within the modified ontology; and
   select the provider service based on the modified ontology and including accessing the modified ontology from within the storage unit to determine that the request sub-concept is a sub-concept of a provider sub-concept.

10. The computer program product of claim 9, wherein the instructions cause the computer system to:

invoke the provider service selected by the selection unit so that a specified set of data is obtained from the provider service.

11. The computer program product of claim 9, wherein the instructions cause the computer system to:

determine the provider service from one or more invoked provider services based on specified sets of data of the one or more invoked provider services.

12. The computer program product of claim 9, wherein the instructions cause the computer system to:

select the provider services including applying subsumption reasoning to subsume a sub-concept of the generic contract.

13. The system of claim 1, wherein the provider services are each associated with different ontologies, and wherein the transformer unit is configured to transform the provider services into the provider sub-concepts that are concepts of the ontology and sub-concepts of the generic contract.

14. The system of claim 13, wherein the transformer unit is configured to transform the service request and the providers services into sub-concepts of the generic contract, including mapping portions thereof to properties and ranges of the ontology, wherein properties of the ontology to which the portions have been mapped are added to the request sub-concept and the provider sub-concepts, respectively, with corresponding ranges.

* * * * *